(12) United States Patent
Walker

(10) Patent No.: US 6,661,562 B2
(45) Date of Patent: Dec. 9, 2003

(54) OPTICAL MODULATOR AND METHOD OF MANUFACTURE THEREOF

(75) Inventor: James A. Walker, Howell, NJ (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 88 days.

(21) Appl. No.: 09/932,218

(22) Filed: Aug. 17, 2001

(65) Prior Publication Data

US 2003/0035196 A1 Feb. 20, 2003

(51) Int. Cl.⁷ .............................................. G02B 26/00
(52) U.S. Cl. ........................ 359/295; 359/291; 359/290
(58) Field of Search ................................. 359/223, 224, 359/290, 291, 295, 318, 271

(56) References Cited

U.S. PATENT DOCUMENTS

| | | | |
|---|---|---|---|
| 5,646,772 A | | 7/1997 | Yurke ........................... 359/290 |
| 5,724,176 A | * | 3/1998 | Nishikitani et al. .......... 359/271 |
| 5,745,271 A | | 4/1998 | Ford et al. .................... 359/130 |
| 5,757,536 A | * | 5/1998 | Ricco et al. .................. 359/224 |
| 5,774,252 A | | 6/1998 | Lin et al. ...................... 359/224 |
| 5,867,302 A | * | 2/1999 | Fleming ........................ 359/291 |
| 5,943,158 A | * | 8/1999 | Ford et al. .................... 359/295 |
| 2002/0054422 A1 | * | 5/2002 | Carr et al. .................... 359/291 |
| 2002/0163709 A1 | * | 11/2002 | Mizra ........................... 359/295 |

OTHER PUBLICATIONS

"The Art of Electronics" by Paul Horowitz and Winfield Hill; 1980; pp. 603–605.

"Dynamic Spectral Power Equalization Using Micro–Opto–Mechanics" by Joseph E. Ford and James A. Walker; 1998 IEEE; pp. 1440–1442.

\* cited by examiner

*Primary Examiner*—Georgia Epps
*Assistant Examiner*—Tim Thompson

(57) ABSTRACT

An optical modulator having an optical modulator window coupled to a substrate and a method of manufacture thereof. In one embodiment, the optical modulator includes at least one drive electrode that adjusts a portion of the optical modulator window to attenuate light passing therethrough. The optical modulator further includes a sense element configured to measure a characteristic associated with the optical modulator window.

21 Claims, 2 Drawing Sheets

OPTICAL MODULATOR AND METHOD OF MANUFACTURE THEREOF

TECHNICAL FIELD OF THE INVENTION

The present invention is directed, in general, to optical electronics, and more specifically, to an optical modulator and method of manufacture thereof.

BACKGROUND OF THE INVENTION

Micro-electromechanical system ("MEMS") optical modulators have been shown highly desirable for use in flattening and equalizing the gain spectrum of an optically amplified system. One such example of a MEMS optical modulator is disclosed in U.S. Pat. No. 5,943,158, entitled "Micro-Mechanical, Anti-Reflection, Switched Optical Modulator Array and Fabrication Method," by Ford, et al., which is hereby incorporated by reference in its entirety.

An optical modulator, such as that disclosed in Ford et al., generally creates and judiciously modulates a controlled reflectivity surface that is put in the path of an optical signal, such as a spectrally dispersed signal. As a result, the optical modulator selectively reflects, and thereby attenuates, a desired spectral amplitude. The reflectivity, and hence the attenuation, of the optical modulator may be set by controlling the distance, also called an "airgap thickness" or a "gap layer", between a suspended dielectric film or "membrane" (perhaps with an upper and lower optically active polysilicon film attached) and a reflective silicon substrate. The amplitude of the airgap thickness or gap layer may in turn be a function of an attractive force created by an electromagnetic field developed between electrodes disposed proximate the membrane and conductors disposed upon a reflective silicon substrate or the reflective silicon substrate itself.

A nagging problem with optical modulators of the past, however, is the need to provide optical feedback to control the position of the membrane while drive electrodes associated with the membrane undergo a voltage bias. For instance, among other things, gas in the space or gap (i.e., the "airgap") between the membrane and the silicon substrate can ionize due to the applied electromagnetic field. As a result of this ionization, electrostatic charges may build up on the membrane itself, thereby changing the electromagnetic force between the membrane and the silicon substrate. The change in electromagnetic force then, in turn, may disadvantageously lead to a change in the membrane position, which ultimately may lead to an undesirable change in the constant of reflectivity, and hence an undesirable change in reflectivity.

Presently, however, the only system for providing feedback to control the reflectivity of the optical modulator is to monitor the output optical signal at specific wavelengths, and then to compare this signal to the desired signal level. Computer processor control may then be used to set the drive voltages at the electrodes to correct for deviations. Unfortunately, the optical monitors for providing this feedback signal are expensive, add optical loss, and complicate the optical design, even should such problems as the charge buildup on the membrane be resolved.

Accordingly, what is needed in the art is a system that better monitors the position of the membrane of the optical modulator that overcomes the deficiencies associated with the prior art.

SUMMARY OF THE INVENTION

To address the above-discussed deficiencies of the prior art, the present invention provides an optical modulator having an optical modulator window coupled to a substrate and a method of manufacture thereof. In one embodiment, the optical modulator includes at least one drive electrode that adjusts a portion of the optical modulator window to attenuate light passing therethrough. The optical modulator further includes a sense element configured to measure a characteristic associated with the optical modulator window.

In another aspect, the present invention provides an optical modulator that includes a substrate and a gap layer located over the substrate. The optical modulator also includes a modulator region located over the gap layer. The optical modulator still further includes a drive electrode located proximate to the modulator region and a sense element located proximate to the modulator region.

In yet another aspect, the present invention a method of manufacturing an optical modulator over a substrate. The method includes forming a gap layer over the substrate and a modulator region over the gap layer. The method also includes forming a drive electrode over the modulator region and forming a sense element over the modulator region proximate the drive electrode.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
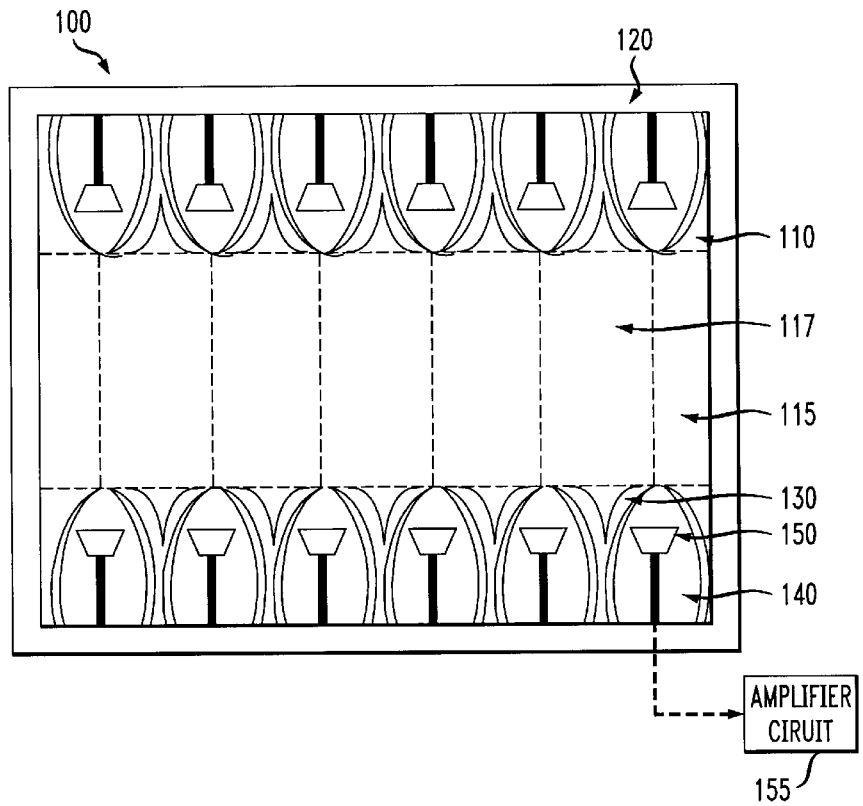
FIG. 1 illustrates a top view of an embodiment of an optical modulator constructed according to the principles of the present invention.

Referring initially to FIG. 1, illustrated is a top view of an embodiment of an optical modulator 100 constructed according to the principles of the present invention. The optical modulator 100 has a released membrane 110. An optical modulator window 115 may be formed in an area of the released membrane 110. The released membrane 110 may typically be composed of a dielectric film, such as silicon nitride. The released membrane 110 may also have additional polysilicon films disposed about the dielectric film.

The optical modulator 100 may also have a plurality of opposing pairs of drive electrodes (one of which is designated 130 and synonymously referred to as a drive electrode 130) coupled to the optical modulator window 115. The drive electrode 130 can individually configure one of a plurality of functional optical regions 117 of the optical modulator window 115, although the optical modulator window 115 itself is typically a continuous strip integral device. The drive electrode 130 is configured to drive the optical modulator window 115 to advantageously attenuate light, perhaps through setting the functional optical region 117 of the optical modulator window 115 at a given vertical displacement from a substrate 120. The substrate 120 may be polished. The light so attenuated may be spectrally differentiated light, and different spectral frequencies may have different chosen attenuation rates. The optical attenuation shall be described in more detail below.

The drive electrode 130 may overly an "airgap" region, which is not shown in FIG. 1. The airgap may be generally defined as a gas in a free space (or gap) between the optical modulator window 115 and a substrate 120. An "airgap thickness", or "gap layer", may be generally defined as the distance between the optical modulator window 115 and the substrate 120. The substrate 120 may be formed of a doped silicon, such as polysilicon doped with a p-type or n-type dopant. Alternatively, if the substrate is non-conductive, a conductive material may be deposited in a region of the substrate 120 beneath the drive electrode 130. The substrate 120 or the conductive material of the substrate 120 may have a common ground coupled thereto.

An attractive force between the drive electrode 130 and the substrate 120 may be created when a voltage is applied between the drive electrode 130 and the substrate 120. The attractive force results in a change of a vertical distance between the functional optical region 117 (associated with the drive electrode 130) and the substrate 120, thereby leading to an advantageous modification of spectral attenuation.

The optical modulator 100 also has a membrane cutaway region 140 that may be formed in an analogous manner to the released membrane 110. The membrane cutaway regions 140 are indirectly coupled to the respective drive electrode 130, perhaps to allow for an independent motion between drive electrodes 130.

The optical modulator 100 may also have a plurality of holes (not shown), such as may be placed in the released membrane 110, perhaps for such reasons as described in U.S. Pat. No. 5,646,772, entitled "Methods and Apparatus for a Multi-Electrode Micromechanical Optical Modulator," to Yurke, which is hereby incorporated by reference in its entirety. The general uses of holes in an optical modulator is well known to those skilled in the art, and will not hereinafter be described detail.

The membrane cutaway region 140, although not directly coupled to the drive electrode 130, may be coupled to the optical modulator window 115 itself. Disposed on and through the membrane cutaway region 140, there may also be a corresponding sense element (e.g., forming a sense capacitor, one of which is designated 150). Of course, other devices or circuitry can be used in place of the sense capacitor 150 and still be within the broad scope of the present invention. The sense capacitor 150 may be formed from the material of the membrane cutaway region 140.

In particular, the sense capacitor 150 may be formed from an upper and lower layer of conductive or conductively doped polysilicon and the intervening dielectric, such as silicon nitride. The sense capacitor 150 and the drive electrode 130 may be formed of polysilicon, or formed of, or be doped with, such materials as aluminum, platinum, tungsten and gold.

The sense capacitor 150 is also proximate the gap layer. The sense capacitor 150 may be used to measure information advantageous for the use of the optical modulator 100. For instance, this information may include a vertical displacement of the functional optical region 117 from the substrate 120. Of course, the information may encompass any characteristics associated with the optical modulator window 115. The sense capacitor 150 may be coupled to an amplifier circuit 155 or to any other appropriate measurement circuit.

Typically, the sense capacitor 150 registers a capacitance or change of capacitance associated with the membrane cutaway region 140. The membrane cutaway region 140 may in turn be coupled to the functional optical region 117. The tension associated with the membrane cutaway region 140 changes as a function of the vertical displacement of the functional optical region 117, so hence may the capacitance of the sense capacitor 150.

The sense capacitor 150 may then be used to measure the vertical distance or gap layer between the functional optical region 117 and the underlying substrate 120, and hence the optical attenuation. The change of tension may occur as a result of the drive electrode 130 moving the functional optical region 117 toward or away from the substrate 120.

The amplitude of the gap layer and changes thereof may be a function of the force acting upon the drive electrode 130 as a result of an applied voltage differential between the drive electrode 130 and the substrate 120. This force may in turn vertically displace the functional optical region 117 of the optical modulator window 115. The measurement (e.g., the tension of the dielectric film of the membrane cutaway region 140) by the sense capacitor 150 may aid in the calculation of an optical attenuation of a functional optical region 117 of the optical modulator window 115 at a given spectral frequency.

As disclosed in Ford, et al., and elaborated below, light that has been spectrally filtered and dispersed may impinge upon the surface of the optical modulator window 115. A given percentage of this light may then either be absorbed or reflected back by the optical modulator window 115, perhaps as a function of optical destructive interference as set up between the optical modulator window 115 and the distance the light must travel to the substrate 120. As is understood by those skilled in the art, optical standing waves between the substrate 120 and the optical modulator window 115 may result in either the reflection or absorption of the impinging light, or a percentage thereof.

To reiterate the above, the sense capacitor 150 may be used to help measure and calculate this vertical distance or gap layer between the functional optical region 117 and the underlying substrate 120. There may be measured, for instance, a change of capacitance associated with the sense capacitor 150 due to the vertical displacement of the functional optical region 117, which may in turn be caused by the drive electrode 130.

The sense capacitor 150 may be used by various measuring circuits (e.g., a microphone amplifier circuit such as a ADXL50 accelerometer manufactured by Analog Devices of Sunnyvale, Calif.), perhaps for use in a feedback subsystem for further utilization of the drive electrodes 130. The sense capacitor 150 may be used to help judiciously determine and compensate for optical properties of the optical modulator window 115 or perhaps another part of the optical modulator 100. An embodiment of an amplifier circuit employable with the optical modulator 100 in accordance with the principles of the present invention will be illustrated and described with respect to FIG. 3.

Once the capacitance of the sense capacitor 150 is determined, the actual distance between the functional optical region 117 and the substrate 120 can be measured and calculated. The measured and calculated distance may be compared to a preferred distance for a desired optical attenuation from the functional optical region 117 and the substrate 120. Once a discrepancy between the measured distance and the desired distance has been calculated, a voltage applied to the drive electrode 130 may be modified to adjust the distance accordingly. The vertical distance between the functional optical region 117 and the substrate 120 (i.e., the gap layer) is therefore measured by the sense capacitor 150 to, among other things, more directly fine-tune the desired attenuation of the functional optical region 117.

Figure 2:
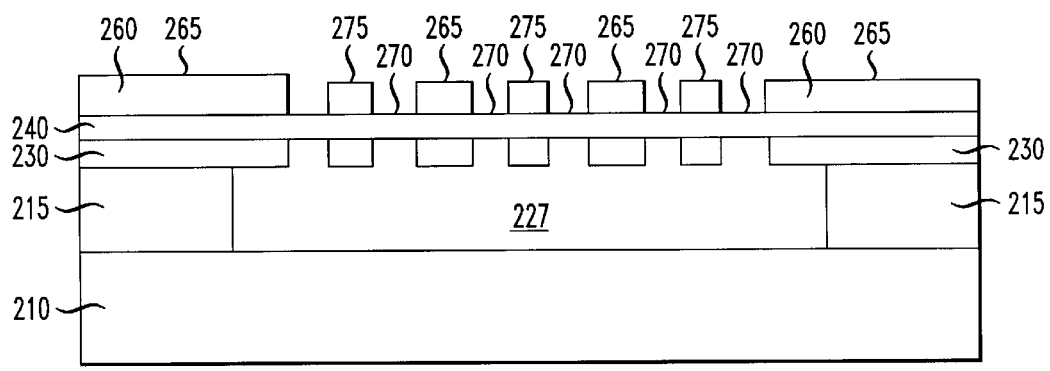
FIG. 2 illustrates a cross sectional view of an embodiment of an optical modulator constructed according to the principles of the present invention.

Turning now to FIG. 2, illustrated is a cross sectional view of an embodiment of an optical modulator 200 constructed according to the principles of the present invention. The optical modulator 200 is preferably constructed on a substrate 210, such as a heavily doped silicon wafer which may be conventionally doped with a p-type or n-type dopant. A doped silicon layer 215 is deposited over the substrate 210, and in one embodiment is deposited to a thickness of about 1.1 millimeters. The silicon layer 215 may be deposited using low pressure chemical vapor deposition. The concentrations of the dopants mentioned above may vary and depend upon the degree of conductivity desired and overall design requirements.

A first doped polysilicon layer 230, which may be approximately 1100 Angstroms thick, is formed over (using for instance low pressure chemical vapor deposition) the silicon layer 215 (shown after wet etch access holes have been employed, as to be described in more detail below). Subsequently, a dielectric layer 240, such as a silicon nitride layer, is formed. The dielectric layer 240 preferably has a refractive index of approximately 2.0 and may be formed using a low pressure chemical vapor deposition. The thickness of the dielectric layer 240, in an advantageous embodiment is roughly 1950 Angstroms.

A second doped polysilicon layer 260 is subsequently formed over the dielectric layer 240. The first and second doped polysilicon layers 230, 260 and silicon layer 215 are developed to make certain portions susceptible to removal by a subsequent wet etch process. Wet etch openings (not shown) are then formed through the first and second doped polysilicon film layers 230, 260 and the dielectric layer 240 down to the silicon layer 215 using a conventional reactive ion etching process. Finally, the wafer is immersed in an hydrofluoric acid solution, which etches selectively the silicon, thereby forming a gap layer 227 and forms upper and lower portions of the drive electrodes 265, optical windows 270, sense elements 275. The deposition, dopants and implantation processes used to form the first and second doped polysilicon layers 230, 260 are well known to those skilled in the art.

Thus, the foregoing exemplary manufacturing process provides the optical modulator 200 including, in part, the substrate 210 and the gap layer 227. The optical modulator 200 includes drive electrodes (one of which is designated 265) and sense elements (one of which is designated 275) and the dielectric layer 240 that also functions as an optical modulator windows 270. Thus, in an exemplary embodiment, the dielectric layer 240 serves both as an optical window for the optical modulator 200 and as a dielectric layer between first and second polysilicon layers 230, 260.

The first and second polysilicon layers 240, 260 and the dielectric layer 240 located therebetween may be configured to either drive electrodes 265 or sense elements 275, as design specifications require. Exposed portions of the dielectric layer 240 located between pairs of oppositely placed drive electrodes 265 and the sense elements 275 form a membrane region that is part of the dielectric layer 240. For instance, the configuration of the drive electrodes 265 could instead be used to operate as sense elements 275, and visa-versa.

In one embodiment, the first and second doped polysilicon film layers 230, 260 may also be connected to a common ground (not shown), which may help to discharge any charge building up on the dielectric layer 240, thereby reducing any resulting unwanted forces arising between the dielectric layer 240 and the substrate 210.

Typically, the drive electrodes 265 are electrically isolated from each other and from the optical windows 270. The sense elements 275 are also electrically isolated from each other and the optical window region. Therefore, when viewing the optical modulator 200 via a cross section, a region of dielectric layer 240 may electrically, although perhaps not physically, separate adjacent drive electrodes 265 and sense elements 275 from the optical modulator window. The drive electrode 265 may use either of the multiple independent layers of doped first and second polysilicon film layers 230, 260 as the conductive, and hence, drive electrode 265. The sense element 275 may, however, be formed from both the first and second polysilicon film layers 230, 260 and the silicon nitride layer 240 and hence form a single functional unit.

Figure 3:
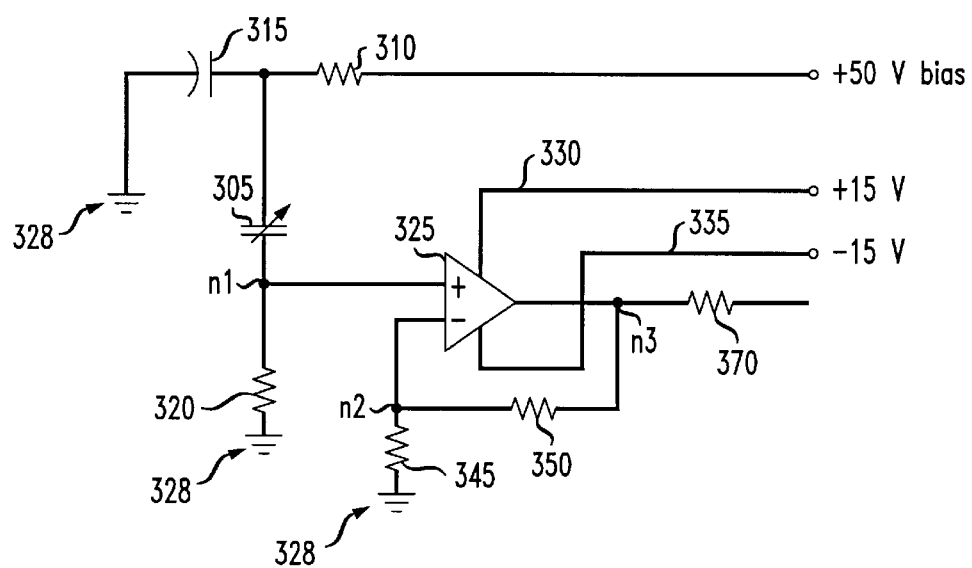
FIG. 3 illustrates a schematic diagram of an embodiment of an amplifier circuit employable with an optical modulator in accordance with the principles of the present invention.

Turning now to FIG. 3, illustrated is a schematic diagram of an embodiment of an amplifier circuit 300 employable with an optical modulator in accordance with the principles of the present invention. The amplifier circuit 300 senses characteristics associated with a sense element (e.g., a sense capacitor 305).

An amplifier 325 of the amplifier circuit 300 has a high voltage rail 330 and a low voltage rail 335. As is well known in the art, the high and low voltage rails 330, 335 limit an output voltage of the amplifier 325. A clamping capacitor 315 of the amplifier circuit 300 advantageously cooperates with a clamping resistor 310 to advantageously filter and smooth any undesirable voltage changes from a voltage source 312.

As is well known in the art, the amplifier 325 attempts to drive a substantially similar voltage between a positive input node n1 and a negative input node n2. This driven voltage from the negative input node n2 in turn creates a voltage across a second input resistor 345 from the negative input node n2 to a common ground 328. The voltage across the second input resistor 345 creates a current flow. This current flow is fed to the second input resistor 345 through a feedback resistor 350 from an output node n3 of the amplifier 325. This current flow through the feedback resistor 350 therefore creates a voltage at the output node n3 of the amplifier 325 proportional to the voltage at the positive input node n1, subject to the maximum positive and negative voltage rails 330, 335 as detailed above. An output resistor 370 is coupled to the output node n3 to impede a potential current flow from the output node n3 to a device which measures an amplified output voltage.

In one embodiment of the present invention, the amplifier 325 is configured to behave as a capacitive amplifier. A relationship between the sense capacitor 305 and the negative input node n2 shall now be illustrated. If there is no change of capacitance of the sense capacitor 305, a full voltage of the voltage source 312 appears across the sense capacitor 305, and the voltage at the positive input node n1 stays substantially at ground. Consequently, by the operation of the amplifier 325, the negative input node n2 would also be at ground. Accordingly, no current would be forced to flow through the second input resistor 345, and hence no current is forced to flow through the feedback resistor 350. Therefore, the voltage at the output node n3 would be substantially zero. No change of the voltage across the sense capacitor 305 means a substantially ground voltage at the positive input node n1, and therefore the voltage at the output node n3 would be measured to be substantially zero as well.

However, if there is either an increase or a decrease of capacitance of the sense capacitor 305, then a corresponding increase or decrease in voltage should manifest at the positive input node n1. When any voltage manifests at the positive input node n1, a corresponding proportional decrease or increase in voltage should then manifest at the output node n3 as well. This manifestation may be derived from the fact that there is a substantially inverse relationship between a voltage across the sense capacitor 305 and the capacitance of that same sense capacitor 305, assuming that a stored charge of the sense capacitor 305 remains substantially constant at the different capacitances.

In one embodiment of the present invention, because the capacitance of the sense capacitor 305 may be changed as the tension of the dielectric configured between the upper and lower plates of the sense capacitor 305 (and hence perhaps the tension associated with the sense capacitor 150 and the optical modulator window 115 of FIG. 1) is varied, there may be a transient change of voltage of the sense capacitor 305 as well. (For more information please see generally the text "Electromagnetic Fields and Waves, Second Edition" by Lorrian and Corson, published by W. H. Freemen and Company, 1970, which is herein incorporated by reference in its entirety).

In a quiescent state, the voltage at the positive input node n1 would be at substantially ground. However, if the sense capacitor 305 is in a nonquiescent state, a non-zero voltage at the positive input node n1 would manifest, with a proportional non-zero voltage also manifesting across a first input resistor 320. The voltage at the positive input node n1 may then be amplified by a factor of the inverse of one more than the resistance of the feedback resistor 350 divided by the resistance of the second input resistor 345. This voltage value may be measured at the output node n3.

In one embodiment of the present invention, the voltage across the sense capacitor 305 may therefore vary as a result of a variation between the distance between the sense capacitor 150 and the common ground associated with a substrate. This change of voltage of the sense capacitor 305 is measured and amplified, and this measured and amplified voltage is manifested at the output node n3.

From a measurement of a change of voltage across the sense capacitor 305, a change of capacitance of the sense capacitor 305 can be deduced by those of ordinary skill in the art. In accordance with the optical modulator of FIG. 1, from this deduced change of capacitance, the distance between an optical modulator window and a reflective substrate may then be derived. From the distance between a modulator region of the optical modulator and the reflective surface of a substrate, the attenuation of light for any given frequency can be calculated. Once the attenuation of light for a given frequency is calculated, a drive electrode can be adjusted and driven accordingly in an appropriate manner for the appropriate feedback for the optical modulator.

For further exploration which may be related to the above areas, please consult "Dynamic Spectral Power Equalization Using Micro-Opto Mechanics" by J. E. Ford and J. A. Walker in Phot. Tech. Lett., Vol. 10, pp. 1440–1442 (1998) and "The Art of Electronics" by P. Horowitz and W. Hill, published by Cambridge University Press, pp 603–605 (1980), both of which are incorporated by reference in their entirety.

Although the present invention has been described in detail, those skilled in the art should understand that they can make various changes, substitutions and alterations herein without departing from the spirit and scope of the invention in its broadest form.

What is claimed is:

1. An optical modulator comprising:
   a released membrane dielectric layer including an optical modulator window;
   at least one drive electrode coupled to said released membrane dielectric layer adjacent said optical modulator window and configured to adjust a portion of said optical modulator window to attenuate light passing therethrough; and
   a sense element coupled to said released membrane dielectric layer adjacent said optical modulator window and configured to measure a characteristic associated with said optical modulator window.

2. The optical modulator as recited in claim 1 wherein said sense element provides a determination of an attenuation of said light.

3. The optical modulator as recited in claim 1 comprising a pair of drive electrodes located on opposing sides of said optical modulator window.

4. The optical modulator as recited in claim 1 wherein said sense element is a first sense element and further comprising a second sense element located on an opposing side of said optical modulator window.

5. The optical modulator as recited in claim 4 wherein said drive electrode is a first drive electrode located adjacent said first sense element and further comprising a second drive electrode located adjacent said second sense element.

6. The optical modulator as recited in claim 1 wherein said sense element is coupled to an amplifier circuit.

7. The optical modulator as recited in claim 1 wherein said sense element is configured to measure a capacitance associated with the optical modulator window.

8. An optical modulator, comprising:
   a substrate;
   a gap layer located over said substrate;
   a released membrane dielectric layer located over said gap layer and including a modulator region;
   a drive electrode coupled to said released membrane dielectric layer and located adjacent said modulator region; and
   a sense element coupled to said released membrane dielectric layer and located adjacent said modulator region.

9. The optical modulator as recited in claim 8 wherein said modulator region comprises an optical modulator window.

10. The optical modulator as recited in claim 9 comprising a pair of drive electrodes located adjacent said modulator region and on opposing sides of said optical modulator window.

11. The optical modulator as recited in claim 8 comprising a plurality of drive electrodes and a plurality of sense elements located proximate to said modulator region.

12. The optical modulator as recited in claim 11 wherein each of said plurality of drive electrodes is located adjacent a corresponding one of said plurality of sense elements.

13. The optical modulator as recited in claim 8 wherein said modulator region is formed from at least silicon nitride.

14. The optical modulator as recited in claim 8 wherein said drive electrode and sense element are formed from a material selected from the group consisting of:
- aluminum,
- platinum,
- tungsten,
- conductive silicon, and
- gold.

15. A method of manufacturing an optical modulator, comprising:
- providing a substrate;
- forming a gap layer over said substrate;
- forming a released membrane dielectric layer including a modulator region over said gap layer;
- coupling a drive electrode to said released membrane dielectric layer and adjacent said modulator region; and
- coupling a sense element to said released membrane dielectric layer and adjacent said modulator region proximate said drive electrode.

16. The method as recited in claim 15 further comprising forming an optical modulator window in said modulator region.

17. The method as recited in claim 16 further comprising forming a pair of drive electrodes on opposing sides of said optical modulator window.

18. The method as recited in claim 15 further comprising forming a plurality of drive electrodes and a plurality of sense elements over said modulator region.

19. The method as recited in claim 18 wherein each of said plurality of drive electrodes is located adjacent a corresponding one of said plurality of sense elements.

20. The method as recited in claim 15 wherein said modulator region is formed from at least silicon nitride.

21. The method as recited in claim 15 wherein said drive electrode and sense element are formed from a material selected from the group consisting of:
- aluminum,
- platinum,
- tungsten,
- conductive silicon, and
- gold.

* * * * *